United States Patent

[11] 3,580,011

| [72] | Inventor | Erwin Pfarrwaller<br>Winterthur, Switzerland |
|---|---|---|
| [21] | Appl. No. | 879,135 |
| [22] | Filed | Nov. 24, 1969 |
| [45] | Patented | May 25, 1971 |
| [73] | Assignee | Sulzer Brothers Limited<br>Winterthur, Switzerland |
| [32] | Priority | June 13, 1969 |
| [33] | | Switzerland |
| [31] | | 9049/69 |
| | | Continuation-in-part of application Ser. No. 676,590, Oct. 19, 1967, now abandoned. |

[54] COUPLING
2 Claims, 10 Drawing Figs.

| [52] | U.S. Cl. | 64/27 |
|---|---|---|
| [51] | Int. Cl. | F16d 3/14 |
| [50] | Field of Search | 64/27;<br>192/106.2 |

[56] References Cited
UNITED STATES PATENTS

| 1,820,749 | 8/1931 | Loeffler | 64/27F |
| 2,183,130 | 12/1939 | Binder | 192/106.2 |
| 3,514,974 | 6/1970 | Adachi | 64/27 |

*Primary Examiner*—Mark M. Newman
*Assistant Examiner*—Randall Heald
*Attorney*—Pennie, Edmonds, Morton, Taylor and Adams ABSTRACT: A coupling for the transmission of torques comprises two discs and means to permit limited relative rotation of the discs, with friction between them. For restoration of an equilibrium relative angular position of the discs, there are oppositely acting separate circumferentially disposed springs of adjustable prestress engaged between the two discs. In another embodiment each of the springs is permitted to undergo compression but not expansion, and the prestressed compression of the springs undergoing compression for one sense of relative rotation of the discs is greater than the maximum force of friction between the discs so that upon release of the discs they will be restored to their equilibrium relative angular position notwithstanding the force of friction.

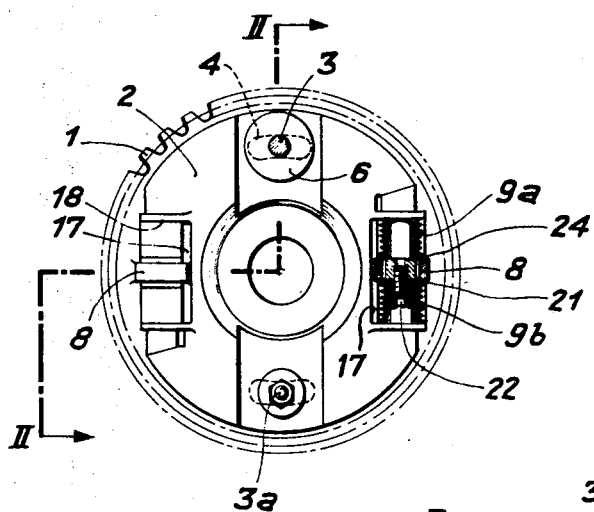
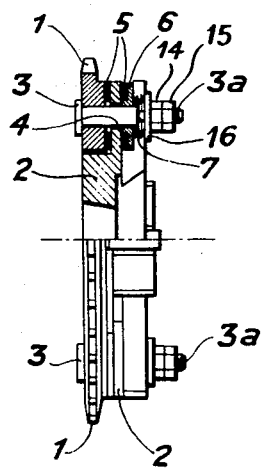
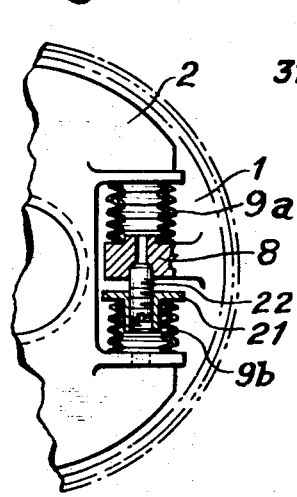
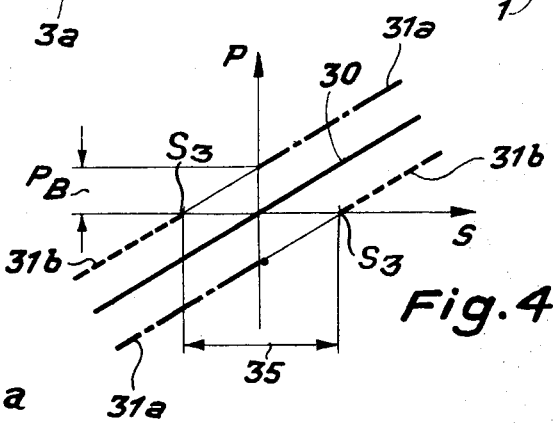
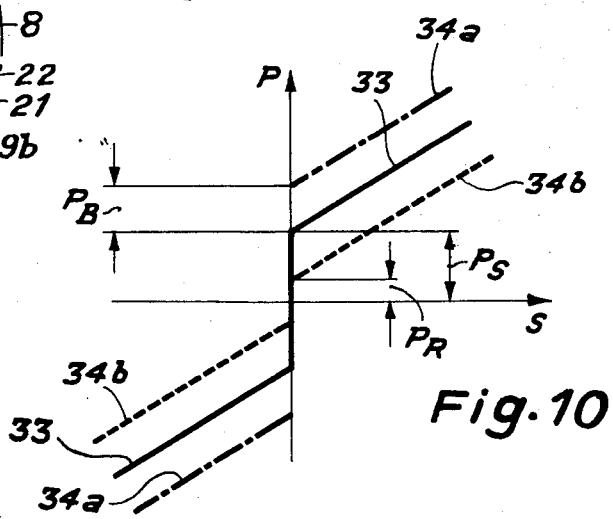
Inventor:
Erwin Pfarrwaller

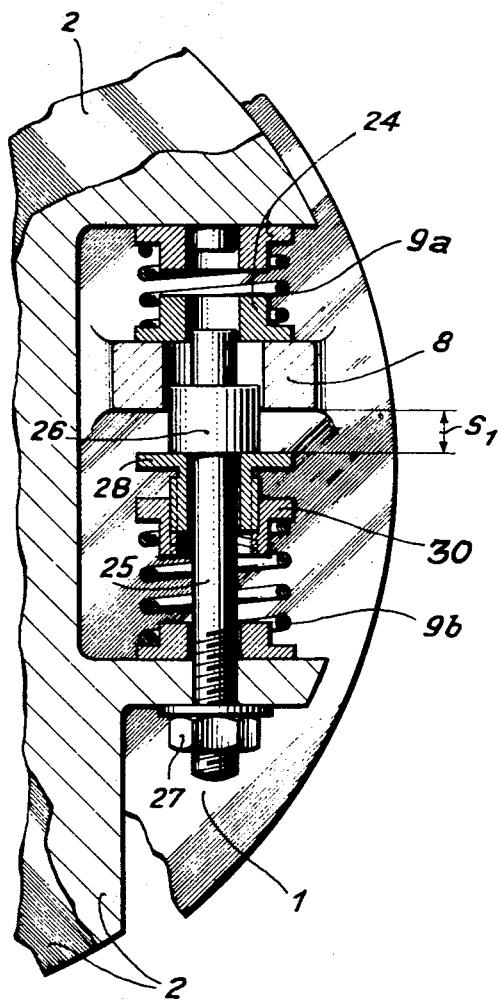
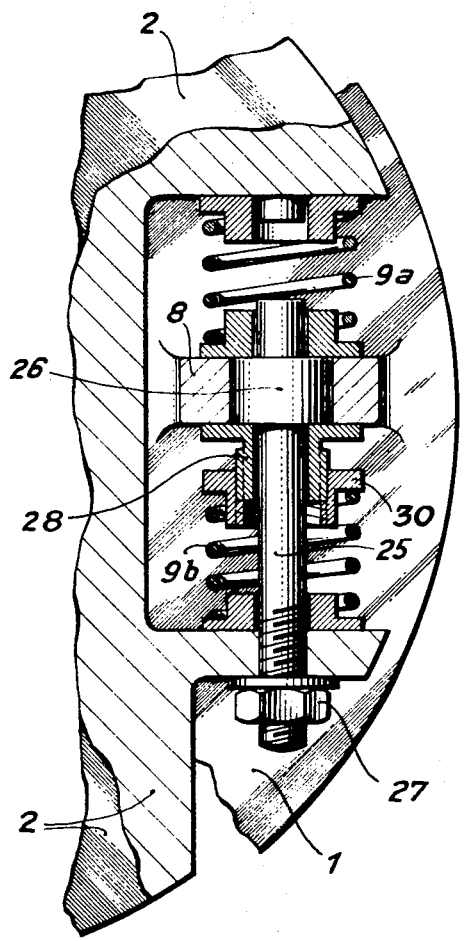

Inventor:
Erwin Pfarrwaller

COUPLING

The present application is a continuation-in-part of my application Ser. No. 676,590, filed Oct. 19, 1967 now abandoned.

BACKGROUND OF THE INVENTION

The present invention relates to couplings for the transmission of torque. It is known to minimize the deleterious effects of variable loads and of shocks in the transmission of torques by the insertion of elastic couplings into a drive shaft, for example.

Thus for example shaft couplings are known in which the adjacent ends of the driving and driven shafts, which may have round or polygonal cross sections, are enclosed in a sheath which couples the two shaft ends together, an elastic shock absorbing insert of rubber or similar material being interposed between the shafts and the sheath. The desired relative position of the parts can be maintained by gluing or vulcanizing them. Such a coupling is often adequate, but its capacity to permit angular displacements between the driving and driven shafts and its capacity to absorb peak or shock energies is very small. Such a coupling is not adjustable in that the degree of elasticity thereof cannot be modified or adjusted to a desired value once the coupling has been manufactured. It is moreover not easily disassembled, even when the shafts are stationary.

Other elastic couplings operate on the principle of the dog clutch in which the studs, claws or teeth fixed to one clutch plate and penetrating into holes in the other clutch plate are provided with elastic damping coverings. These couplings can be disassembled or opened, but the yield thereof is not great and cannot be adjusted once the coupling has been finished.

In another known elastic coupling one of the shaft ends carries a sheath which may have an opening of square cross section therein into the other shaft end penetrates, the other shaft end similarly having a square cross section but of a smaller size. The diagonal of the cross section of the male member corresponds approximately to one side of the rectangular opening in the female member or sheath, and the two shaft ends are then angularly displaced by about 45°. Thus the diagonals of the two cross sections are substantially 45° apart. Cylindrical elastic rolls or cylinders of rubber are forced into the four triangular spaces between the male and female members. These rubber inserts provide a yielding coupling between the two shafts. Upon relative rotation of the two shafts, the four rubber inserts undergo elastic deformation, but there is retained a positive drive which is well-adapted to transmit torques even of suddenly changing value. The extent of relative rotation of the two shafts depends upon the load and may be substantial. It cannot, however, be adjusted after the coupling is completed. Moreover, this known coupling is incapable of transmitting axial forces such as are involved in bevel gear drives, for example.

SUMMARY OF THE INVENTION

In contrast, the loom drive of the invention provides a coupling which comprises two coupling discs which can be rotated with respect to each other about a common axis and in addition a slip clutch element under compression which in event of overload of the coupling permits a relative rotation of two discs, with frictional engagement between them. The coupling additionally includes a restoring mechanism which, upon disappearance of the overload, produces a return of the discs to their initial relative angular position, either exactly or approximately. The coupling of the invention may further include an abutment or abutments which limit the relative rotation of the discs.

By means of the frictionally loaded slippage coupling of the invention, torque loads in a drive incorporating that coupling which exceed a limiting value are yieldingly absorbed. This limiting value can moreover be adjusted, in the coupling of the invention, by adjustment of the pressure exerted by the coupling between the elements thereof. Thus, it is possible to adjust the coupling for the loads encountered thereby and to establish a load limit beyond which the coupling will yield, with braking in the slippage of its parts over each other. In this way a substantial portion of the energy involved in the overload will be transformed into heat instead of motion. The relative rotation of the driving and driven coupling discs is limited by operation of the restoring mechanism, and finally by the abutment. The permitted extent of such relative rotation can be adjusted by adjusting the position of the abutment. By operation of the restoring mechanism, the initial relative position is substantially restored when the excess load disappears.

BRIEF DESCRIPTION OF THE DRAWING

The invention will now be further described in terms of a number of exemplary embodiments and with reference to the accompanying drawings. In these drawings:

FIG. 1 is a diagrammatic representation of one embodiment of the coupling of the invention, looking along the axis of rotation thereof;

FIG. 2 is a side view, partly in axial section, of the apparatus of FIG. 1;

FIG. 3 is a fragmentary view at an enlarged scale of the embodiment of FIG. 1;

FIG. 4 is a graph useful in explaining the operation of the embodiment of FIGS. 1—3;

FIGS. 6—9 are fragmentary views at an enlarged scale of the embodiment of FIG. 5, with the two discs thereof in various relative angular positions; and FIG. 10 is a graph similar to that of FIG. 4, but illustrating the operation of the embodiment of FIGS. 5—9.

DESCRIPTION OF PREFERRED EMBODIMENTS

Figure 5:
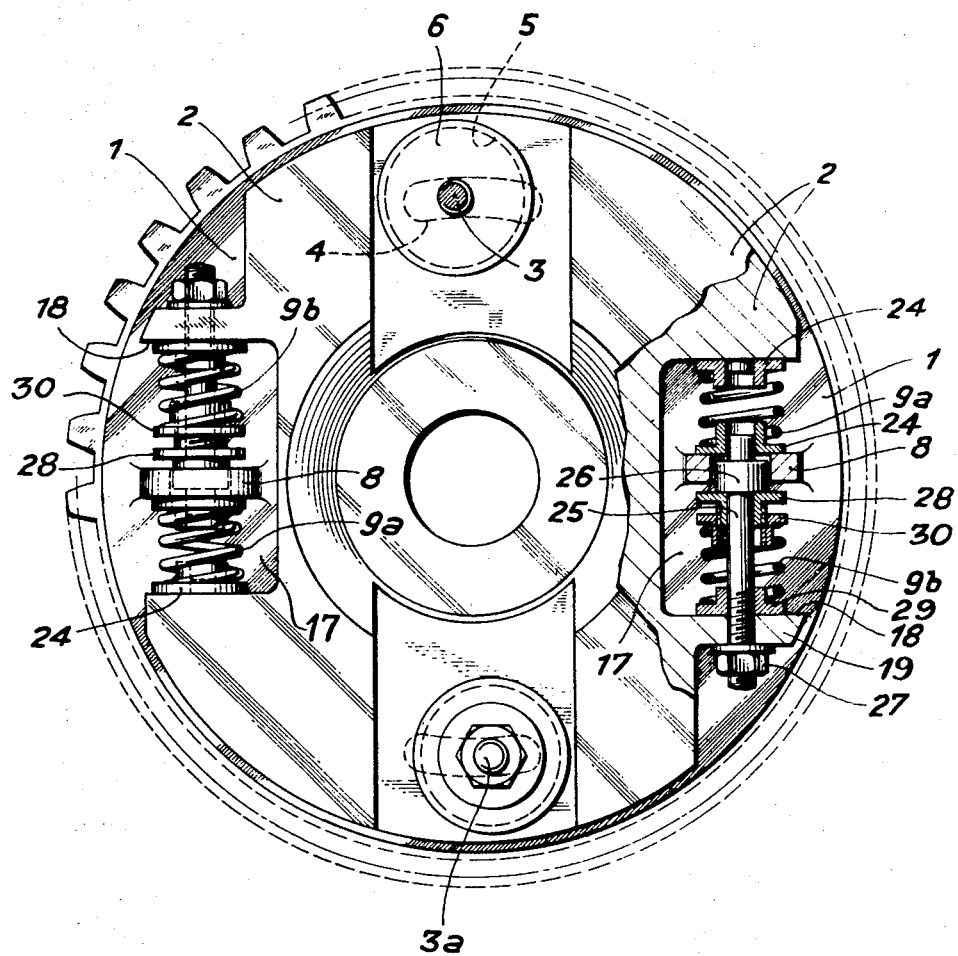
FIG. 5 is a view similar to that of FIG. 1 but illustrating another embodiment of the invention, the two discs of the embodiment of FIG. 5 being shown moreover displaced with respect to each other from their equilibrium relative angular position.

In the embodiment of the coupling of the invention illustrated in FIGS. 1 to 3, the disc 1 is shown as a sprocket wheel with teeth on the rim thereof. The disc 1 has affixed thereto two studs 3 which are riveted, screwed, shrunk-fit or otherwise fastened to it. These studs engage in arcuate slots 4 of the second coupling disc 2. Both discs are annular in shape. Relative angular displacement of the discs is thus limited by these slots. The studs are threaded, as indicated at 3a in FIG. 2. Each stud carries a nut 14 and lock nut 15, bearing against a washer 16. The washer 16 provides an abutment for a plurality of axially extending compression springs 7, which in turn press against a circular cover plate or washer 6, seen also in FIG. 1. This plate 6 presses against the coupling disc 2, friction elements or brakeshoes 5 being provided between the plate 6 and disc 2 and also between the discs 1 and 2. The springs 7 thus serve to compress, at each stud 3, one brakeshoe 5 between the washer or plate 6 and the disc 2, and another brakeshoe between the discs 2 and 1. The pressure on the brakeshoes can be varied by adjustment of the nuts 14 and lock nuts 15.

There is thus provided a coupling having the capacity of transmitting angular moments or torques up to a limiting value without slipping. Upon the appearance of an excess torque, the two coupling discs 1 and 2 will rotate with respect to each other until the studs 3 reach the ends of the arcuate slots 4. The brakeshoes have during this relative rotation a damping and energy absorbing effect, and they thereby transform into heat a portion of the energy represented by the peak in torque.

As illustrated in FIG. 1 and in more detail in FIG. 3, restoration of two discs to their initial relative position upon disappearance of the excessive torque is effected by the tangentially or circumferentially operating springs 9 which are engaged at one end with a spring holder 8 fastened to the disc 1 and at the other end with corresponding bearing surfaces on the disc 2. More particularly, the disc 2 has formed therein a pair of cutouts 17, and the disc 1 has formed thereon or fastened thereto a pair of spring-supporting protuberances 8 which, in the assembled coupling, extend into the cutouts 17. Compression coil springs 9a and 9b extend in either direction from each of these protuberances, as shown in FIGS. 1 and 3, and bear against the end surfaces 18 of the cutouts 17. In the event of relative rotation of the two discs, these springs tend to restore the two discs to their initial angular position with respect to each other. The prestressing of the springs 9 can be adjusted by means of threadedly interengaging members 21 and 22 provided in each of the cutouts 17.

As seen in FIG. 3, the screw 22 rests against an unthreaded socket in the protuberance 8. The threaded sleeve 21 engaged by the screw includes a flange against which the spring 9b rests. By adjustment of the engagement of the members 21 and 22, the amount of prestressing of the springs 9a and 9b can be adjusted. At the other one of the cutouts 17 (the one not shown in FIG. 3), the pair of members 21 and 22 should be above the protuberance 8 and not below it. Thus, if at the cutout shown in FIG. 3 the member 21 is shifted away from the protuberance 8 to compress the two springs, the relative angular position of the discs at which the two springs are equally stressed will change to a position in which the disc 1 is rotated counterclockwise to the disc 2. It will be seen that the arrangement of the parts at the other one of the cutouts should be such that an increase in the prestressing of the springs there will shift in the same circumferential sense the relative angular position of the discs for equilibrium. Consequently, at the other cutout the members 21 and 22 should be above the protuberance 8 instead of below it.

FIG. 4 illustrates certain properties of the coupling of FIGS. 1—3. In FIG. 4, torque between the discs is plotted vertically against relative angular displacement of the discs horizontally. The torque $P_B$ is the slippage torque of the discs one with respect to the other, produced by the frictional engagement of the brakeshoes 5. This torque always acts in the sense opposite to that of an imposed relative rotation. If there is applied to the coupling a torque in any amount up to $P_B$, the discs will not move with respect to each other. For higher torques they will move one with respect to the other, the relation of torque transmitted to angular position assumed being for increasing torques that of the chain-dotted lines 31a in the first and fourth quadrants of the graph, according to the sense of the torque. On the other hand, the torque transmitted by the springs 9a and 9b or, what is the same thing, the restoring force of those springs, is indicated by the straight line curve 30 which passes through the origin of the graph.

Upon reduction in an externally applied torque from a value higher than $P_B$, the discs will return toward their equilibrium relative position identified by the origin of the S axis, so long as the restoring force 30 due to the springs is greater than the frictional torque $P_b$. The consequence is that the angular position-torque relation on decline of an applied torque is that of the dashline curves 31b, so that the discs will not be restored to a position closer to the origin on the graph than that denoted by the relative angular positions $S_3$. These are separated by an angular interval identified on the graph of FIG. 4 by reference character 35.

An embodiment of the coupling of the invention wherein the coupling discs return unambiguously to a single relative angular position when the torque transmitted through the coupling falls to zero is illustrated in FIGS. 5—9. In this embodiment the frictional coupling between the discs 1 and 2 may be provided by elements of structure 3—7 and 14—16 as in the embodiment of FIGS. 1—3. Again, two cutouts 17 are provided in discs 2, accommodating with clearance protuberances 8 on disc 1.

Considering the cutout at the right in FIG. 5, there will be seen a bolt 25 affixed to the disc 2 by threaded engagement therewith at a portion 19 thereof. The bolt may be locked in place by means of a lock nut 27. The protuberance 8 is apertured to accommodate a stop member or collar 26 affixed to the bolt, having the same thickness as the protuberance and centered therein when the relative position of discs 1 and 2 locates the protuberance 8 halfway between the upper and lower limits 18 of the cutout.

Two flanged sleeve members 24 are provided at the ends of the upper spring 9a and two similar flanged sleeve members 29 and 30 are provided at the ends of the lower spring 9b. The member 30 is moreover threaded to a similar member 28 to permit adjustment of the prestressing of the springs. The member 24 adjacent the protuberance 8 and the member 28 are dimensioned each to rest against both the protuberance 8 and the collar 26.

The other cutout 17, at the left in FIG. 5, accommodates structure which may be identical with that just described for the right-hand cutout, and having moreover the same circumferential sense. That is, the adjustable members 28 and 30 are above the protuberance 8 at the left instead of below it, as at the right.

Figure 9:
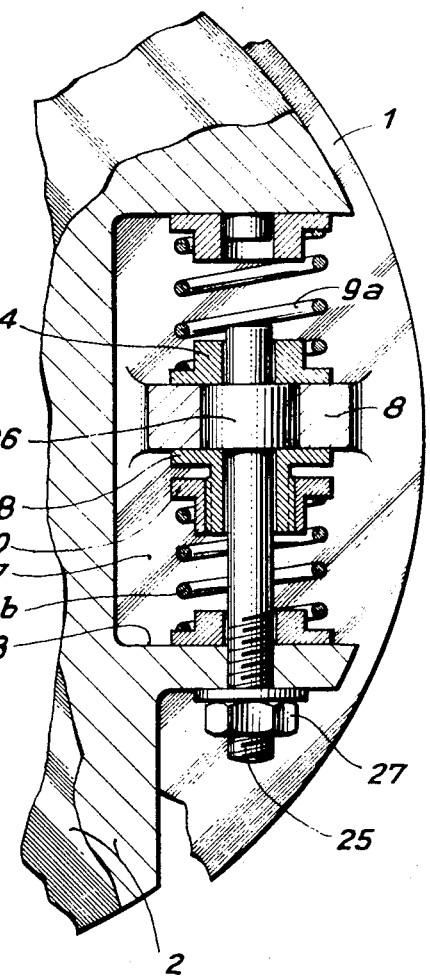

The equilibrium relative angular position of the discs is that shown in FIGS. 7 and 9, with the collars 26 inside the apertures through protuberances 8 so that the end surfaces of the collars are flush with the faces of the protuberances. FIGS. 7 and 9 differ simply in the relative position of the elements 28 and 30 and, hence, in the prestressing of the springs.

The effect of the collars 26 and bolts 25 is that, upon the imposition on the coupling of a sufficient torque, the discs will rotate with respect to each other and thereby produce a further compression of one of the springs 9a and 9b at each cutout, whereas the other of those springs will be prevented from expanding to a state of lower stress. Consequently, even in the absence of all friction between the discs, a torque would be transmitted through the coupling without shift of the discs relative to each other until that torque reaches a value corresponding to the prestressing of the two springs, one at each of the two cutouts, which tends to be placed under greater compression by the torque.

If there is applied to the coupling a torque sufficiently exceeding the slippage torque established at the friction elements 3—7 and 14—16, for example in the sense tending to rotate disc 1 counterclockwise with respect to disc 2 as indicated in FIG. 5, i.e. raising the protuberance 8 in the right-hand cutout by the distance $S_1$ (FIG. 6), the upper spring 9a will be compressed by this amount, whereas the lower spring 9b in the right-hand cutout will be held by the collar 26 at its previous state of compression.

The operating characteristics of the coupling of FIGS. 5—9 are illustrated in FIG. 10, a graph which plots for that coupling the same quantities as are plotted in FIG. 4 for the coupling of FIGS. 1 to 7. If in FIG. 10 $P_s$ represents the torque corresponding to the prestressing of two of the four springs, i.e. the minimum torque at which, in the absence of friction the discs would shift with respect to each other, then it is seen that, in the absence of such friction, the torque-angular position characteristic of the coupling would be that of the full line curve 33. Curve 33 leaves the torque axis P only for torques numerically greater than either $+P_s$ or $-P_s$. In fact however friction exists between the two discs, in an amount providing a slippage friction torque $P_B$. With that friction, the characteristic for increasing torque is in fact that of the chain line curve 34a, again including separate limbs in the first and fourth quadrants. For decreasing torques it is that of the two-limbed curve 34b. Thus, with declining torques applied, the relative angular position of the discs returns, towards smaller relative angular displacements, along the curve 34b all the way to zero relative angular displacement under influence of the prestressed spring torque $P_s$, and even at zero relative angular displacement this exceeds the frictional torque by the difference $P_R$.

Figure 8:
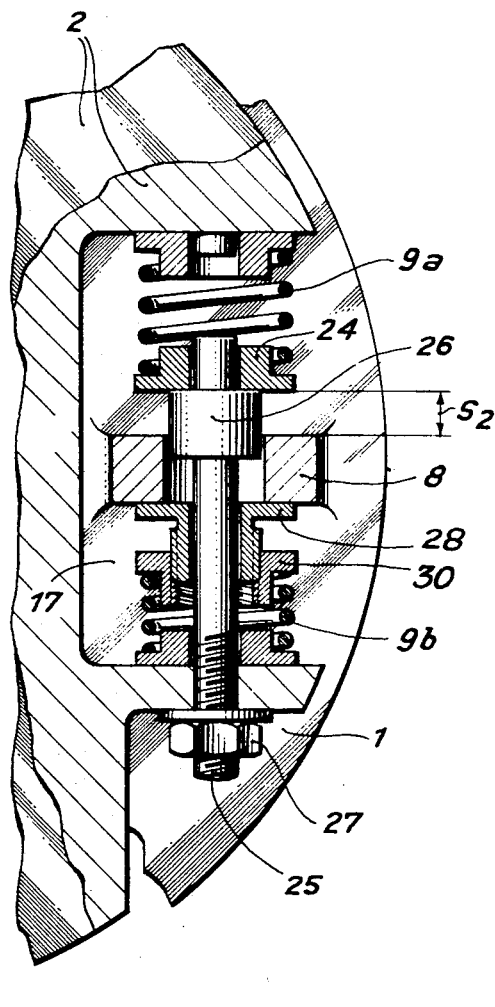

FIG. 6 illustrates a condition in which disc 1 has been rotated counterclockwise with respect to disc 2, as is also the case in FIG. 5. In both FIGS. both of the bolts 25 are under a tension which does not, however, contribute to the torque transmitted between the discs. In FIG. 8 the disc 1 has been rotated clockwise with respect to the disc 2, and the bolt 25 is under compression from the upper spring 9a thereshown, this torque again not contributing to the torque transmitted between the discs.

The coupling of FIGS. 1 to 3 thus comprises two discs 1 and 2 mounted coaxially in a common axis. The disc 1 has a protuberance 8 which extends parallel to the axis of the coupling from an extra-axial location. The disc 2 includes an aperture 17 having circumferential clearance from the protuberance 8. One of the springs 9a and 9b in FIG. 1 constitutes first resilient means engaged between the protuberance 8 and one circumferential limit of the aperture 17. The other of those springs constitutes a second resilient means which are engaged together with the threaded members 21 and 22 between the protuberance 8 and the other circumferential limit of the aperture 17. The compression springs 7 constitute third resilient means stressing the two discs together axially.

The coupling of FIGS. 5 to 9 likewise comprises two discs 1 and 2 mounted coaxially in an axis, and the springs 7 and brake shoes 5 constitute frictional means interconnecting the discs. The springs 9a and 9b constitute first and second resilient means engaged respectively between the protuberance 8 on disc 1 and circumferentially opposite limits of the aperture 17 in disc 2, and the bolt 25 and its collar 26 constitute means to retain, on relative rotation of the discs, that one of the springs 9a and 9b form which the protuberance recedes with such rotation.

While the invention has been described hereinabove in terms of number of presently preferred embodiments, the invention is not limited thereto. For example, the disc 1 need not take the form of a sprocket wheel; it may instead be affixed to one shaft with the disc 2 being affixed to another shaft. More generally, the invention comprehends all modifications of and departures from the embodiments described properly falling within the appended claims.

I claim:

1. A coupling comprising two discs mounted coaxially in a common axis, one of said discs having a protuberance having extension parallel to said axis from an extra axial location, the other of said discs having an aperture therein for reception of said protuberance with circumferential clearance therefrom, first resilient means engaged between said protuberance and one circumferential limit of said aperture, two interengaging threaded members, second resilient means engaged with said threaded members between said protuberance and the other circumferential limit of said aperture, and third resilient means stressing said discs together axially.

2. A coupling comprising two discs mounted coaxially in a common axis, frictional means interconnecting said discs, one of said discs having a protuberance having extension parallel to said axis from an extra axial location, the other of said discs having an aperture therein for reception of said protuberance with circumferential clearance therefrom, first and second resilient means engaged respectively between said protuberance and circumferentially opposite limits of said aperture, and means affixed to the other of said discs to retain, on relative rotation of said discs, that one of said resilient means from which said protuberance recedes with said rotation.